(12) United States Patent
Huang

(10) Patent No.: US 9,829,716 B1
(45) Date of Patent: Nov. 28, 2017

(54) HEAD MOUNTED DISPLAY

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 2 days.

(21) Appl. No.: 15/232,818

(22) Filed: Aug. 10, 2016

(30) Foreign Application Priority Data

May 25, 2016 (TW) .............................. 105116194 A

(51) Int. Cl.
| | |
|---|---|
| *G02B 27/01* | (2006.01) |
| *G02B 27/22* | (2006.01) |
| *G02B 25/00* | (2006.01) |
| *G02B 27/14* | (2006.01) |
| *G02B 26/08* | (2006.01) |

(52) U.S. Cl.
CPC ....... *G02B 27/2264* (2013.01); *G02B 25/001* (2013.01); *G02B 26/0833* (2013.01); *G02B 27/01* (2013.01); *G02B 27/0172* (2013.01); *G02B 27/14* (2013.01); *G02B 27/2235* (2013.01)

(58) Field of Classification Search
CPC G02B 27/0172; G02B 27/2264; G02B 27/14; G02B 27/2235; G02B 27/22; G02B 27/017; G02B 27/01; G02B 2027/0178; G02B 25/001; G02B 26/0833
USPC ........................................................ 359/471
See application file for complete search history.

(56) References Cited

U.S. PATENT DOCUMENTS 4,805,988 A * 2/1989 Dones ................ G02B 27/0172
 348/42
5,035,474 A * 7/1991 Moss ..................... G02B 27/01
 359/13

(Continued)

FOREIGN PATENT DOCUMENTS

| CN | 101285936 A | 10/2008 |
| TW | 201323927 A | 6/2013 |

OTHER PUBLICATIONS

Yuchang Wang, Junejei Huang, 3D head mount display with single panel, SPIE Proceedings vol. 9192: Current Developments in Lens Design and Optical Engineering XV, Sep. 2014.

*Primary Examiner* — William R Alexander
(74) *Attorney, Agent, or Firm* — CKC & Partners Co., Ltd.

(57) ABSTRACT

A head mounted display includes first and second light source modules, a light reversely turning module, an image output module, first and second eyepiece modules, and a beam splitting mirror. The first and second light source modules are respectively configured to emit first and second lights. The image output module is configured to receive the first and second lights, generating first and second image lights with corresponding image information respectively. The light reversely turning module is optically coupled between the first light source module (or the second light source module) and the image output module, making a propagating direction of the first light (or the second light) in reverse to that of the first image light (or the second light). The beam splitting mirror is optically coupled between the image output module and the first/second eyepiece module, guiding the first/second image light into the first/second eyepiece module.

15 Claims, 5 Drawing Sheets

(56) References Cited

U.S. PATENT DOCUMENTS

| | | | | |
|---|---|---|---|---|
| 5,371,556 A | * | 12/1994 | Suwa | G02B 27/0172 348/51 |
| 5,418,584 A | * | 5/1995 | Larson | G02B 5/12 353/122 |
| 5,467,205 A | * | 11/1995 | Kuba | G02B 27/017 348/E13.04 |
| 5,486,841 A | * | 1/1996 | Hara | G02B 7/12 345/8 |
| 5,661,603 A | * | 8/1997 | Hanano | G02B 5/045 359/622 |
| 5,682,173 A | * | 10/1997 | Holakovszky | G02B 27/0172 345/8 |
| 5,712,649 A | * | 1/1998 | Tosaki | G02B 27/017 345/7 |
| 5,739,955 A | * | 4/1998 | Marshall | G02B 23/14 359/631 |
| 5,903,395 A | * | 5/1999 | Rallison | G02B 27/0172 345/8 |
| 6,094,309 A | * | 7/2000 | Ophey | G02B 27/0037 359/618 |
| 6,246,383 B1 | * | 6/2001 | Ophey | G02B 27/0172 345/8 |
| 6,271,808 B1 | | 8/2001 | Corbin | |
| 6,972,735 B2 | | 12/2005 | Hebert | |
| 7,177,080 B2 | * | 2/2007 | Soderlindh | G02B 23/18 349/11 |
| 9,019,172 B2 | * | 4/2015 | Tohara | G02B 27/0172 345/7 |
| 2004/0150884 A1 | * | 8/2004 | Domjan | G02B 27/0172 359/462 |
| 2009/0027772 A1 | | 1/2009 | Robinson | |
| 2009/0153437 A1 | * | 6/2009 | Aharoni | G02B 27/0172 345/8 |
| 2010/0097671 A1 | * | 4/2010 | Leister | G02B 27/0172 359/9 |
| 2011/0292513 A1 | * | 12/2011 | Kubota | G02B 27/0172 359/630 |

\* cited by examiner

HEAD MOUNTED DISPLAY

RELATED APPLICATIONS

This application claims priority to Taiwan Application Serial Number 105116194, filed May 25, 2016, which is herein incorporated by reference.

BACKGROUND

Technical Field

The present disclosure relates to a head mounted display. More particularly, the present disclosure relates to a stereo head mounted display.

Description of Related Art

In recent years, with the increasing development of virtual reality technology, an optical product which can show a stereoscopic image has become a focal point in the consumer market. Conventionally, a head mounted display can respectively provide different images to two eyes of an observer, and the eyes of the observer can respectively receive different image information, so that the observer can perceive a stereoscopic image by exploiting the binocular parallax of typical human sight. However, a conventional head mounted display has a complex structure, a huge size and a heavy weight, which may affect wearing convenience and comfort of the observer.

SUMMARY

The disclosure provides a head mounted display, which can reduce a horizontal area of the head mounted display, and can improve a convenience and a comfort of wearing the head mounted display.

In accordance with some embodiments of the present disclosure, a head mounted display includes a first light source module, a second light source module, a light reversely turning module, an image output module, a first eyepiece module, a second eyepiece module and a beam splitting mirror. The first light source is configured to emit a first light. The second light source module is configured to emit a second light. The image output module is configured to receive the first light and the second light, and to respectively generate a first image light and a second image light with corresponding image information. The light reversely turning module is optically coupled between the first light source module and the image output module, making a propagating direction of the first light in reverse to a propagating direction of the first image light. Similarly, the light reversely turning module is optically coupled between the second light source module and the image output module, making a propagating direction of the second light L2 reverse to a propagating direction of the second image light. The first eyepiece module is configured to make the first image light image to a first target position. Similarly, the second eyepiece module is configured to make the second image light image to a second target position. The beam splitting mirror is optically coupled between the image output module and the first eyepiece module, and the beam splitting mirror is configured to guide the first image light into the first eyepiece module. Similarly, the beam splitting mirror is optically coupled between the image output module and the second eyepiece module, and the beam splitting mirror is configured to guide the second image light into the second eyepiece module.

In one or more embodiments of this disclosure, since a configuration of the first light source module, the second light source module and the beam splitting mirror, the head mounted display can respectively provide two eyes of an observer with the different image information (that is, the first image light and the second image light), and then the different image information received by the two eyes of the observer may be combined in a brain of the observer, so that the observer can perceive a stereoscopic image. Furthermore, the light reversely turning module may make the propagating direction of the first light in reverse to the propagating direction of the first image light, so the first light source module and the image output module may be located on different level heights. Similarly, the light reversely turning module may make the propagating direction of the second light in reverse to the propagating direction of the second image light, so the second light source module and the image output module may be located on different level heights. Therefore, the horizontal area of the head mounted display may be reduced, benefiting to minimize the size of the head mounted display.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
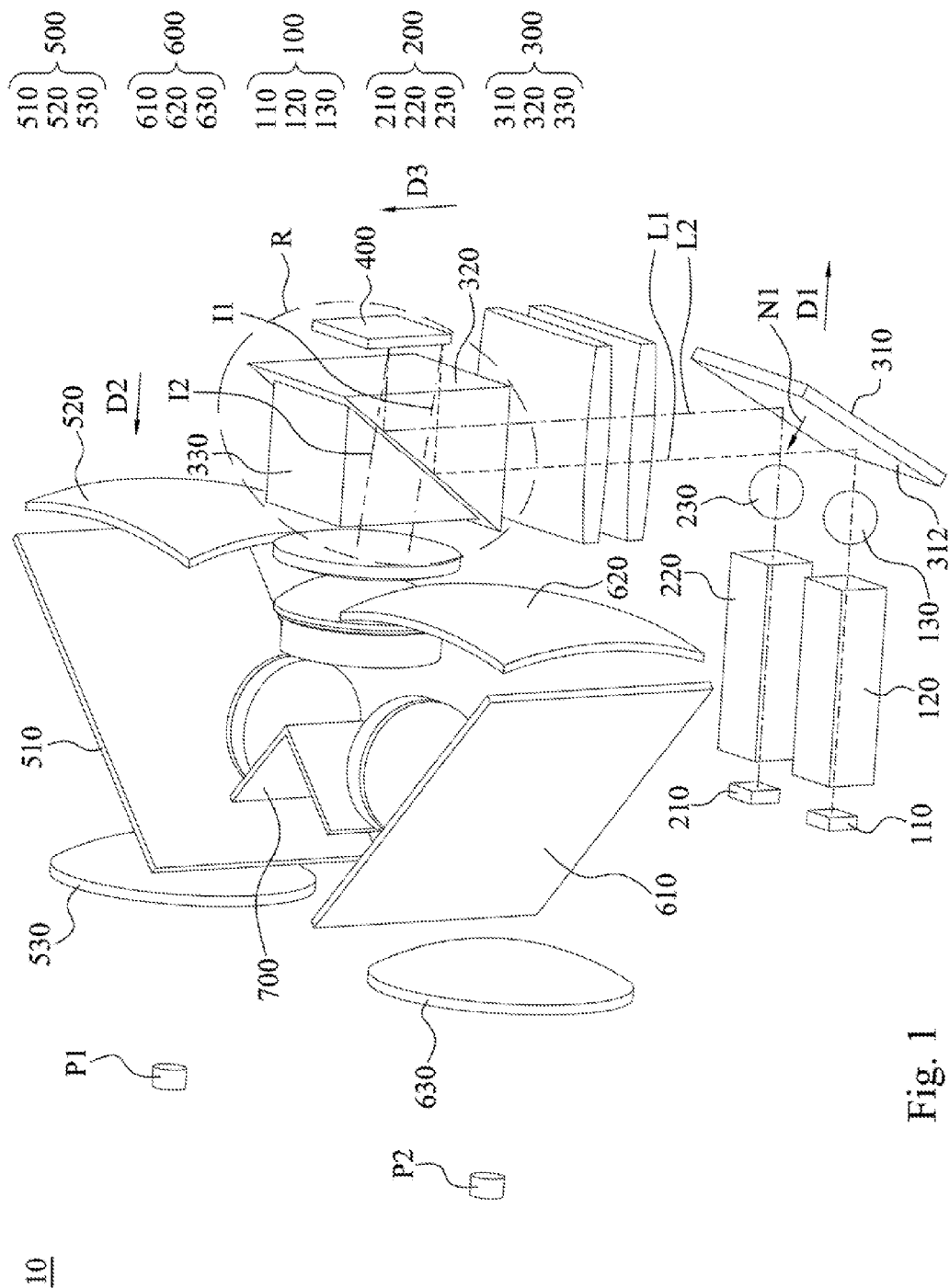
FIG. 1 is a perspective view of a head mounted display in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Furthermore, the term "device A is optically coupled to device B" indicates a light from or through the device A can directly propagate into the device B, and if a light from or through the device A can propagate into the device B, the other optical devices can be interposed between the device A and the device B. Similarly, the term "device A is optically coupled between device B and device C" indicates a light can propagate into the device A, device B and device C, and other optical devices can be interposed between the device A, device B and the device C.

FIG. 1 is a perspective view of a head mounted display in accordance with some embodiments of the present disclosure. As shown in FIG. 1, a head mounted display 10 includes a first light source module 100, a second light source module 200, a light reversely turning module 300, an image output module 400, a first eyepiece module 500, a second eyepiece module 600 and a beam splitting mirror 700. The first light source 100 is configured to emit a first light L1. The second light source module 200 is configured to emit a second light L2. The image output module 400 is configured to receive the first light L1 and the second light L2, and to respectively generate a first image light I1 and a second image light I2 with corresponding image information. The light reversely turning module 300 is optically coupled between the first light source module 100 and the image output module 400, for making a propagating direction of the first image light I1 in reverse to a propagating direction of the first light L1. Similarly, the light reversely turning module 300 is optically coupled between the second light source module 200 and the image output module 400, for making a propagating direction of the second image light I2 in reverse to a propagating direction of the second light L2. The first eyepiece module 500 is configured to make the first image light I1 image to a first target position P1. Similarly, the second eyepiece module 600 is configured to make the second image light I2 image to a second target position P2. The beam splitting mirror 700 is optically coupled between the image output module 400 and the first eyepiece module 500, and the beam splitting mirror 700 is configured to guide the first image light I1 into the first eyepiece module 500. Similarly, the beam splitting mirror 700 is optically coupled between the image output module 400 and the second eyepiece module 600, and the beam splitting mirror 700 is configured to guide the second image light I2 into the second eyepiece module 600. By such a configuration, the head mounted display 10 can respectively provide two eyes of an observer with the different image information (that is, the first image light I1 and the second image light I2), and then the different image information received by the two eyes of the observer may be combined in a brain of the observer, so that the observer can perceive a stereoscopic image.

More particularly, in some embodiments, as shown in FIG. 1, when the first light source module 100 emits the first light L1, the first light L1 may propagate along a first direction D1 (that is, propagating from the left to the right as shown in the figure). When the first light L1 arrives at the light reversely turning module 300, the propagating direction of the first light L1 may be changed by the light reversely turning module 300 for making the first light L1 redirected to the image output module 400. Then, the image output module 400 receives the first light L1 and generates the first image light I1 propagating along a second direction D2 (that is, propagating from the right to the left as shown in the figure). In other words, the light reversely turning module 300 can change an optical path of the first light L1 for making the first light L1 emitted by the first light source module 100 redirected and arrive at the image output module 400. More particularly, in some embodiments, as shown in FIG. 1, the propagating direction of the first light L1 may be changed from the first direction D1 (from the left to the right) into a third direction D3 (from the bottom to the top), and then changed into the first direction D1 (from the left to the right) for going into the image output module 400. Similarly, when the second light source module 200 emits the second light L2, the second light L2 may propagate along the first direction D1 (that is, propagating from the left to the right as shown in the figure). When the second light L2 arrives at the light reversely turning module 300, the propagating direction of the second light L2 may be changed by the light reversely turning module 300 for making the second light L2 redirected to the image output module 400. Then, the image output module 400 receives the second light L2 and generates the second image light I2 propagating along a second direction D2 (that is, propagating from the right to the left as shown in the figure). In other words, the light reversely turning module 300 can change an optical path of the second light L2 for making the second light L2 emitted by the second light source module 200 redirected and arrive at the image output module 400. Accordingly, the optical path of the first light L1 may be changed by the light reversely turning module 300, so the first light source module 100 and the image output module 400 may be located on different level heights. Similarly, the optical path of the second light L2 may be changed by the light reversely turning module 300, so the second light source module 200 and the image output module 400 may be located on different level heights. Therefore, a horizontal area of the head mounted display 10 may be reduced, benefiting to minimize the head mounted display 10.

For example, as shown in FIG. 1, the first light source module 100 is located on a level height h1, and the second light source module 200 is located on a level height h2, and the image output module 400 is located on a level height h3, in which the level height h3 is larger than the level height h2, and the level height h3 is larger than the level height h1. In other words, the first light source module 100 and the second light source module 200 is located below the image output module 400 (as shown in FIG. 1, the first light source module 100 and the second light source module 200 may be located on a lower left of the image output module 400), which may benefit to minimize the horizontal area of the head mounted display 10. For example, in some embodiments, as shown in FIG. 1, the first light source module 100 and the second light source module 200 may be underlying the first eyepiece module 500 and the second eyepiece module 600, so as to minimize the he horizontal area of the head mounted display 10. In some embodiments, the level height h1 where the first light source module 100 is located is substantially equal to the level height h2 where the second light source module 200 is located. In other words, the first light source module 100 and the second light source module 200 are located on the substantially equal level height, thereby benefiting to minimize a thickness of the head mounted display 10.

More particularly, in some embodiments, as shown in FIG. 1, the first light source module 100 may include a solid-state light source array 110. Similarly, the second light source module 200 may include a solid-state light source array 210. The solid-state light source arrays 110 and 210 may include at least one solid-state light source, but is not limited to be, such as a red light source, a green light source or a blue light source, and it may be a light emitting diode or an organic light emitting diode. The first light L1 emitted by the solid-state light source array 110 of the first light source module 100 is substantially a collimated light, that is, a divergence angle of the first light L1 is close to zero. Therefore, after the image output module 400 receives the first light L1, the image output module 400 may generate the substantially collimated first image light I1, so the first image light I1 may be precisely guided into the first target position P1 through the first eyepiece module 500 avoiding the first image light I1 shifting from the first target position P1 to the second target position P2. Similarly, the second light L2 emitted by the solid-state light source array 210 of the second light source module 200 is substantially a collimated light, that is, a divergence angle of the second light L2 is close to zero. Therefore, after the image output module 400 receives the second light L2, the image output module 400 may generate the substantially collimated second image light I2, so the second image light I2 may be precisely guided into the second target position P2 through the second eyepiece module 600 avoiding the second image light I2 shifting from the second target position P2 to the first target position P1. Furthermore, in some embodiments, as shown in FIG. 1, the first light source module 100 and the second light source module 200 may also include tapered rods 120 and 220, and may include ball lenses 130 and 230 configured to adjust the intensity and the uniformity of lights, thereby improving an image quality of the head mounted display 10.

In some embodiments, as shown in FIG. 1, the light reversely turning module has a first light-redirecting unit 310 and a second light-redirecting unit 320, the first light-redirecting unit 310 is configured to reflect and redirect the first light L1 from the first light source module 100 and the second light L2 from the second light source module 200 to the second light-redirecting unit 320, and the second light-redirecting unit 320 is configured to reflect and redirect the first light L1 and the second light L2 from the first light-redirecting unit 310 into the image output module 400. More particularly, in some embodiments, as shown in FIG. 1, the first light-redirecting unit 310 has a reflective surface 312. A distance between the reflective surface 312 and the first light source module 100 (such as the ball lens 130 of the first light source module 100) is increasing along a direction towards the second light-redirecting unit 320, thereby benefiting to reflect and redirect the first light L1 to the second light-redirecting unit 320. In other words, the reflective surface 312 has a normal vector N1 being towards the top left of the figure. Accordingly, when the first light L1 propagates along the first direction D1 and arrives at the reflective surface 312 of the first light-redirecting unit 310, the first light L1 may be reflected by the reflective surface 312 and propagate towards the second light-redirecting unit 320 along the third direction D3. Then, when the first light L1 propagates along the third direction D3 and goes into the second light-redirecting unit 320, the first light L1 can be reflected and redirected by a certain surface of the second light-redirecting unit 320 for propagating towards the image output module 400 along the first direction D1, so the first light L1 can arrive at the image output module 400. Similarly, a distance between the reflective surface 312 and the second light source module 200 (such as the ball lens 230 of the second light source module 200) is increasing along a direction towards the second light-redirecting unit 320, thereby benefiting to reflect and redirect the second light L2 to the second light-redirecting unit 320. Accordingly, when the second light L2 propagates along the first direction D1 and arrives at the reflective surface 312 of the first light-redirecting unit 310, the second light L2 may be reflected by the reflective surface 312 and propagate towards the second light-redirecting unit 320 along the third direction D3. Then, when the second light L2 propagates along the third direction D3 and goes into the second light-redirecting unit 320, the second light L2 can be reflected and redirected by the certain surface of the second light-redirecting unit 320 for propagating towards the image output module 400 along the first direction D1, so the second light L2 can arrive at the image output module 400.

As a result, by the first light-redirecting unit 310 and the second light-redirecting unit 320, the first light L1 from the first light source module 100 and the second light L2 from the second light source module 200 arriving at the image output module 400 may be redirected at least two times, so the image output module 400 can be disposed on the level height being different from the level height where the first light source module 100 and the second light source 200 are disposed (for example, the image output module 400 is disposed on the top right in FIG. 1), thereby minimizing the horizontal area of the head mounted display 10. In some embodiments, for example, the first light-redirecting unit 310 may be a reflected mirror, which may be, but is not limited to be, a reflected mirror with an aluminum coating, a reflected mirror with a metal coating, a reflected mirror with a high reflectivity material, so as to redirect the first light L1 and the second light L2 to the second light-redirecting unit 320 more effectively.

Figure 2:
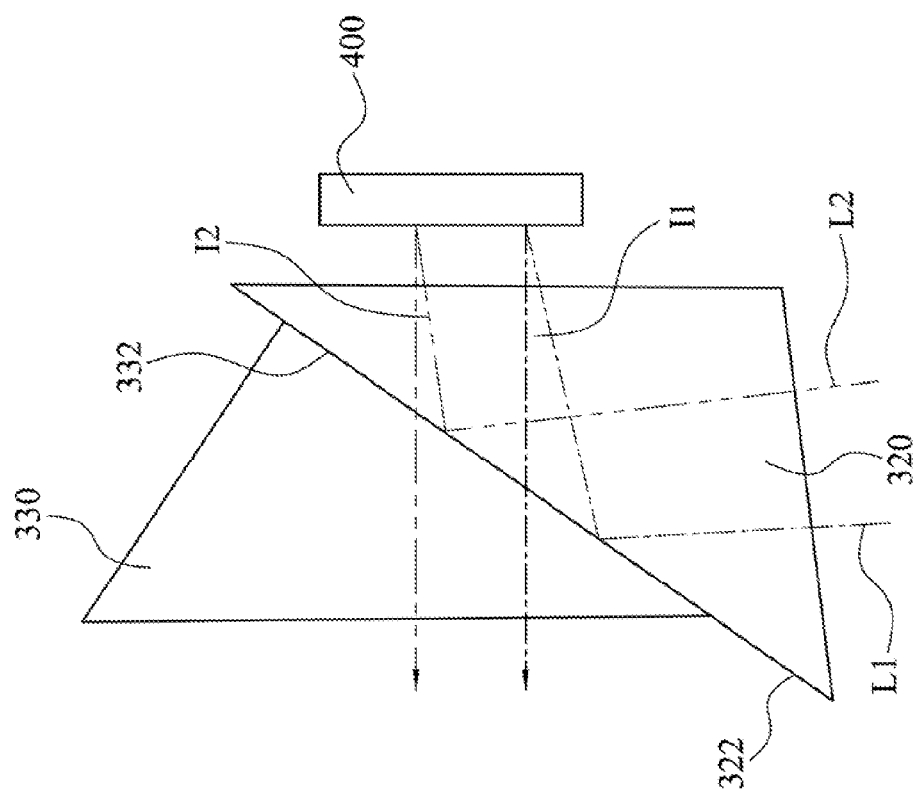
FIG. 2 is an enlarged cross-section view of a local area R of the FIG. 1.

FIG. 2 is an enlarged cross-section view of a local area R of the FIG. 1.

In some embodiments, as shown in FIG. 1 and FIG. 2, the second light-redirecting unit 320 has a redirecting surface 322, the redirecting surface 322 is configured to reflect and redirect the first light L1 and the second light L2 from the first light-redirecting unit 310 to the image output module 400, and the first image light I1 and the second image light I2 generated by the image output module 400 may propagate into the redirecting surface 322, and an incident angle of the first image light L1 and an incident angle of the second image light L2 at the redirecting surface 322 is less than a critical angle of the redirecting surface. The critical angle is a least angle of incidence arriving at the redirecting surface 322 of the second light-redirecting unit 320 above which the total internal reflection occurs. In other words, when the first light L1 arrives at the redirecting surface 322 of the second light-redirecting unit 320, the first light L1 can be reflected and redirected to the image output module 400. Then, the image output module 400 receives the first light L1 and generates the first image light I1 with the image information, since the incident angle of the first image light I1 at the redirecting surface 322 is design to being less than the critical angle, the first image light I1 may not be totally reflected, and the first image light I1 may penetrate the second light-redirecting unit 320, thereby benefiting to guide the first image light I1 into the beam splitting mirror 700. Similarly, when the second light L2 arrives at the redirecting surface 322 of the second light-redirecting unit 320, the second light L2 can be reflected and redirected to the image output module 400. Then, the image output module 400 receives the second light L2 and generates the second image light I2 with the image information, since the incident angle of the second image light I2 at the redirecting surface 322 is design to being less than the critical angle, the second image light I2 may not be totally reflected, and the second image light I2 may penetrate the second light-redirecting unit 320, thereby benefiting to guide the second image light I2 into the beam splitting mirror 700. As a result, by the second light-redirecting unit 320, the optical path of the lights from the first light-redirecting unit 310 may be controlled, and the optical path of the lights from the image output module 400 may also be controlled. For example, in some embodiments, the second light-redirecting unit 320 may be, but is not limited to be, a totally internal reflection prism, so as to separate the first light L1 and the first image light I1 more effectively, and also to separate the second light L2 and the second image light I2 more effectively. For example, in some embodiments, by designs of the incident angles of the first light L1 and the second light L2 arriving at the image output module 400, or designs of the emitting angles of the first image light I1 and the second image light I2 generated by the image output module 400, so the incident angles of the first image light I1 and the second image light I2 at the redirecting surface 322 is less than the critical angle of the redirecting surface 322, but it is not limited.

In some embodiments, as shown in FIG. 1 and FIG. 2, the light reversely turning module 300 further includes a penetrate assist unit 330. The penetrate assist unit 330 is abutted against the redirecting surface 322 of the second light-redirecting unit 320, and the penetrate assist unit 330 and the second light-redirecting unit 320 may have different refractive indexes to make the first light L1 and the second light L2 propagating at the redirecting surface 322 reflected totally, and make at least one part of the first image light I1 and the second image light I2 penetrate the redirecting surface 322. More particularly, in some embodiments, as shown in FIG. 2, the penetrate assist unit 330 may include a connect surface 332, the connect surface 332 is connected to the redirecting surface 322 of the second light-redirecting unit 320, and a refractive index n1 of the penetrate assist unit 330 is less than a refractive index n2 of the second light-redirecting unit 320. Accordingly, when the first light L1 (or the second light L2) from the first light-redirecting unit 310 is transmitted to the redirecting surface 322 of the second light-redirecting unit 320, since the refractive index n1 of the penetrate assist unit 330 is less than the refractive index n2 of the second light-redirecting unit 320, and the incident angle of the first light L1 (or the second light L2) is designed to be larger than the critical angle(arcsin(n/n2)), the first light L1 (or the second light L2) may be totally reflected at the redirecting surface 322. In other words, the first light L1 (or the second light L2) may not penetrate the second light-redirecting unit 320, that is, the first light L1 (or the second light I2) may be totally reflected to the image output module 400. For example, in some embodiments, by designs of the position of the first light source module 100 relative to the image output module 400, the position of the second light source module 200 relative to the image output module 400, the position of the first light-redirecting unit 310 relative to the image output module 400, an angle formed between the normal vector N1 of the first light-redirecting unit 310 and the first light L1 or the second light L2, or an arranged location of the second light-redirecting unit 320, so the incident angle of the first light L1 (or the second light L2) at the redirecting surface 322 may be larger than the critical angle of the redirecting surface 322.

In some embodiments, as shown in FIG. 2, the emitting angle of the first image light I1 is designed to make the incident angle of the first image light I1 arriving at the redirecting surface 322 be less than the critical angle(arcsin (n1/n2)), so the first image light I1 may penetrate the redirecting surface 322. Similarly, the emitting angle of the second image light I2 is designed to make the incident angle of the second image light I2 arriving at the redirecting surface 322 be less than the critical angle(arcsin(n1/n2)), so the second image light I2 may penetrate the redirecting surface 322. It is noted that, in some embodiments, the incident angle of the first light L1 arriving at the image output module 400 can be different from the incident angle of the second light L2 arriving at the image output module 400, so the emitting angle of the first image light I1 generated by the image output module 400 can be different from the emitting angle of the second image light I2 generated by the image output module 400, thereby benefiting to guide the first image light I1 into the first target position P1 and benefiting to guide the second image light I2 into the second target position P2.

For example, in some embodiments, another devices can be applied to separate the optical path of the first light L1 and the optical path of the first image light I1 generated by the image output module 400, and to separate the optical path of the second light L2 and the optical path of the second image light I2 generated by the image output module 400. For example, when the image output module 400 includes a silicon-based liquid crystal cell, the first light L1 and the second light L2 may be converted into the first image light I1 and the second image light I2 with different polarization, and the second light-redirecting unit 320 may include a polarized beam splitter and a quarter-wave plate, so as to separate the optical paths of the first image light I1 and the second image light I2.

In some embodiments, the image output module 400 is a digital micro-mirror device configured to reflect and make the first light L1 from the second light-redirecting unit 320 become the first image light I1 with the image information, and to reflect and make the second light L2 from the second light-redirecting unit 320 become the second image light I2 with the image information. More particularly, the digital micro-mirror device may include a plurality of micro reflected mirrors, so the reflected direction of the light received by each micro reflected mirror can be controlled. Each micro reflected mirror represents an image pixel, and each micro reflected mirror can be driven by a control device, so the micro reflected mirror can be rotated to a corresponding angle, thereby benefiting to reflect a light to a predetermined position.

For example, when the first light L1 is redirected to the digital micro-mirror device by the second light-redirecting unit 320, some of the micro reflected mirrors can be rotated to a first group angle, so as to receive the first light L1 and to reflect the first light L1 to become the first image light I1 with the image information. Similarly, when the second light L2 is redirected to the digital micro-mirror device by the second light-redirecting unit 320, some of the micro reflected mirrors can be rotated to a second group angle, so as to receive the second light L2 and to reflect the second light L2 to become the second image light I2 with the image information. It is noted that the first group angle may be different from the second group angle, so the digital micro-mirror device may generate the different emitting angles for the first image light I1 and the second image light I2 in a reflecting manner. That is, the digital micro-mirror device may generate different optical paths of the first image light I1 and the second image light I2, which may benefit to precisely transmit the first image light I1 to the first eyepiece module 500 by the beam splitting mirror 700, and benefit to precisely transmit the second image light I2 to the second eyepiece module 600 by the beam splitting mirror 700. In other words, when the image output module 400 is the digital micro-mirror device, it may separate the optical paths of the first image light I1 and the second image light I2 more effectively, avoiding the first image light I1 and the second image light I2 from interfering with each other and reflecting the first image light I1 and the second image light I2 to the first eyepiece module 500 and the second eyepiece module 600 more precisely. For example, in some embodiments, the image output module 400 may be a tilt and roll pixel digital micro-mirror device, so as to separate the optical paths of the first image light I1 and the second image light I2 more effectively.

More particularly, in some embodiments, as shown in FIG. 1, the first light L1 emitted by the first light source module 100 propagate along the first direction D1, and the second light L2 emitted by the second light source module 200 propagate along the first direction D1. After the first light L1 and the second light L2 are redirected to the image output module 400 by the light reversely turning module 300, the image output module 400 reflects the first image light I1 and the second image light I2 with the corresponding image information. It is noted that the image output module 400 is designed to reflect and generate the first image light I1 (or the second image light I2) propagating along the second direction D2, in which the first direction D1 is reverse to the second direction D2. In other words, a difference between the propagating direction of the first light L1 (or the second light L2) and the propagating direction of the first image light I1 (or the second image light I2) is 180 degrees.

Figure 3:
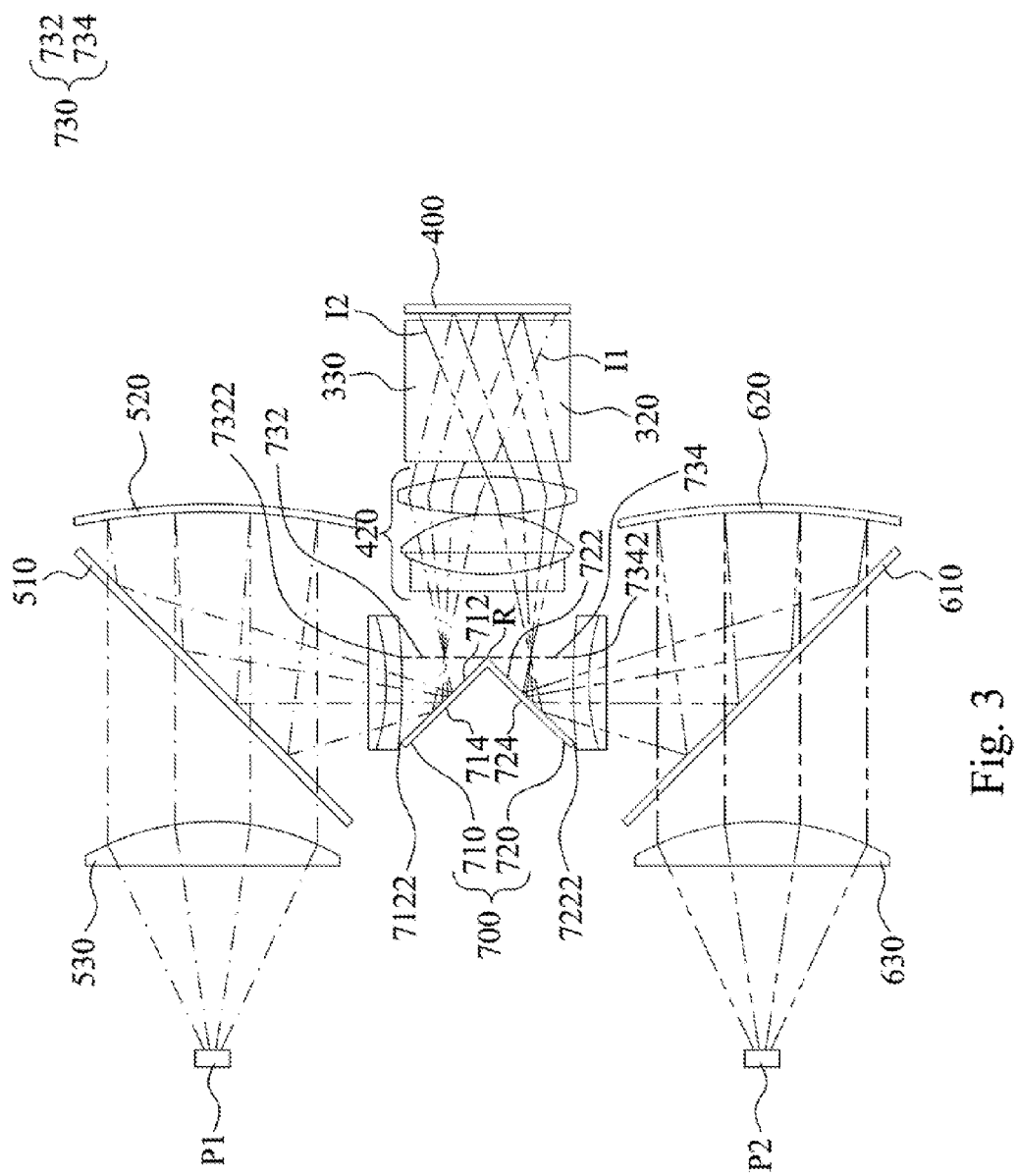
FIG. 3 is a top view of the head mounted display in accordance with some embodiments of the present disclosure.

Reference is made to FIG. 3, which is a top view of the head mounted display in accordance with some embodiments of the present disclosure. More particularly, in some embodiments, as shown in FIG. 3, the beam splitting mirror 700 may include a first beam splitting unit 710 and a second beam splitting unit 720, and the first beam splitting unit 710 is abutted against the second beam splitting unit 720. The first beam splitting unit 710 has a first beam splitting surface 712 and a first rear surface 714 opposite to each other, and the second beam splitting unit 720 has a second beam splitting surface 722 and a second rear surface 724 opposite to each other, and the first rear surface 714 and the second rear surface 724 are facing to each other and form an acute angle. The first beam splitting surface 712 is farther away from the first target position P1 than the first rear surface 714 being, and the second beam splitting surface 722 is farther away from the second target position P2 than the second rear surface 724 being. As shown in FIG. 3, the first beam splitting surface 712 is located on the optical path of the first image light I1, so as to redirect the first image light I1 to the first eyepiece module 500. Similarly, the second beam splitting surface 722 is located on the optical path of the second image light I2, so as to redirect the second image light I2 to the second eyepiece module 600. As a result, the first image light I1 and the second image light I2 may be respectively redirected to the first eyepiece module 500 and the second eyepiece module 600 by the beam splitting mirror 700.

In some embodiments, as shown in FIG. 3, the head mounted display 10 may further include a lens group 420, the lens group 420 is optically coupled between the image output module 400 and the beam splitting mirror 700, and the lens group 420 is configured to adjust qualities of images of the first image light I1 and the second image light I2. For example, a refractive power or another optical parameters of each lens of the lens group 420 may be designed to eliminate a distortion of the first image light I1 and the second image light I2 generated by the image output module 400, which may assist to improve the quality of the first image light I1 imaging to the first target position P1 and to improve the quality of the second image light I2 imaging to the second target position P2.

In some embodiments, as shown in FIG. 3, the first eyepiece module 500 may include a partially light reflective unit 510 and an image-reflected mirror 520. The partially light reflective unit 510 is optically coupled between the first beam splitting unit 710 of the beam splitting mirror 700 and the image-reflected mirror 520. For example, when the first image light I1 arrives at the first beam splitting surface 712 of the first beam splitting unit 710, the first image light I1 may be redirected and guided into the partially light reflective unit 510 in a reflecting manner, and then the partially light reflective unit 510 may redirect a part of the first image light I1 to the image-reflected mirror 520 in a reflecting manner thereby forming a first intermediate image, and the first intermediate image is projected to the first target position P1 by a first eyepiece 530. Similarly, in some embodiments, the second eyepiece module 600 may include a partially light reflective unit 610 and an image-reflected mirror 620. The partially light reflective unit 610 is optically coupled between the second beam splitting unit 720 of the beam splitting mirror 700 and the image-reflected mirror 620. For example, when the second image light I2 arrives at the second beam splitting surface 722 of the second beam splitting unit 720, the second image light I2 may be redirected and guided into the partially light reflective unit 610 in a reflecting manner, and then the partially light reflective unit 610 may redirect a part of the second image light I2 to the image-reflected mirror 620 in a reflecting manner thereby forming a second intermediate image, and the second intermediate image is projected to the second target position P2 by a second eyepiece 630. For example, in some embodiments, the partially light reflective units 510 and 610 may be, but is not limited to be, beam-splitters or totally internal reflection prisms to redirect the first image light I1 (or the second image light I2) to the image-reflected mirror 520 (or the image-reflected mirror 620). Alternatively, in some embodiments, another devices can be applied to redirect the first image light I1 from the beam splitting mirror 700 to the first eyepiece 530, and redirect the second image light I2 from the beam splitting mirror 700 to the second eyepiece 630. For example, when the first image light I1 and the second image light I2 are two different polarized lights, the partially light reflective units 510 and 610 may include a polarized beam splitter and a quarter-wave plate.

More particularly, in some embodiments, as shown in FIG. 3, the first beam splitting surface 712 and the second beam splitting surface 722 may intersect at a ridge R. There is an imaginary plane 730 on which the ridge R lies and perpendicular to an arrange direction of the image output module 400 and the beam splitting mirror 700. The imaginary plane 730 may include a first imaginary plane 732 and a second imaginary plane 734 that intersect at the ridge R. The first imaginary plane 732 and the first beam splitting surface 712 respectively have peripheries 7322 and 7122 distal to the ridge R. The peripheries 7322 and 7122 are aligned in a line perpendicular to the imaginary plane 730. Similarly, the second imaginary plane 734 and the second beam splitting surface 722 respectively have peripheries 7342 and 7222 distal to the ridge R. The peripheries 7342 and 7222 are aligned in a line perpendicular to the imaginary plane 730. The first image light I1 may be propagated to the first beam splitting surface 712 through a center of the first imaginary plane 732. Similarly, the second image light I2 may be propagated to the second beam splitting surface 722 through a center of the second imaginary plane 734. In other words, the first image lights I1 may converge at the center of the first imaginary plane 732, and the second image lights I2 may converge at the center of the second imaginary plane 734.

Figure 4:
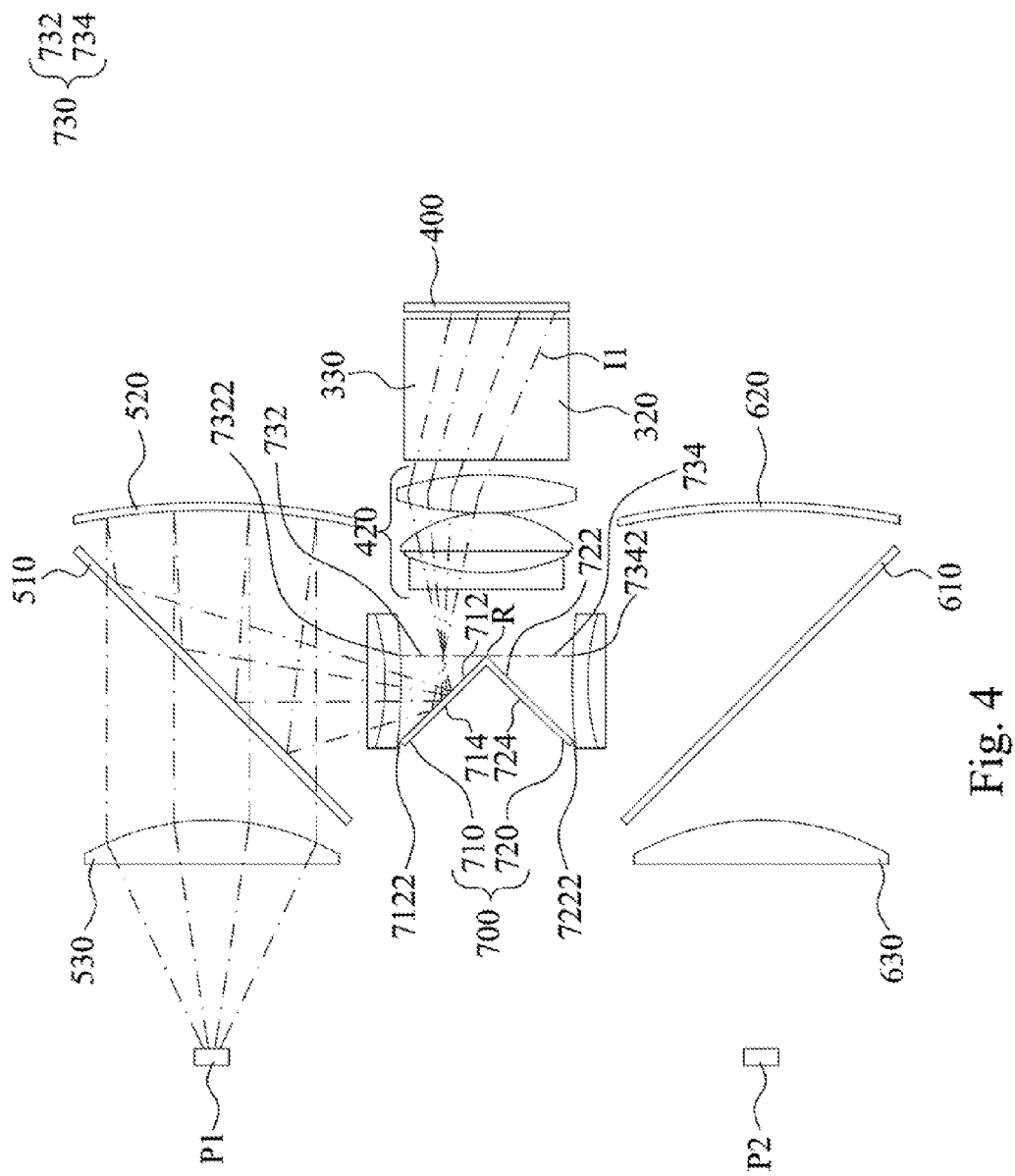
FIG. 4 is a schematic diagram showing an optical path of the head mounted display at a first time point in accordance with some embodiments of the present disclosure.
Figure 5:
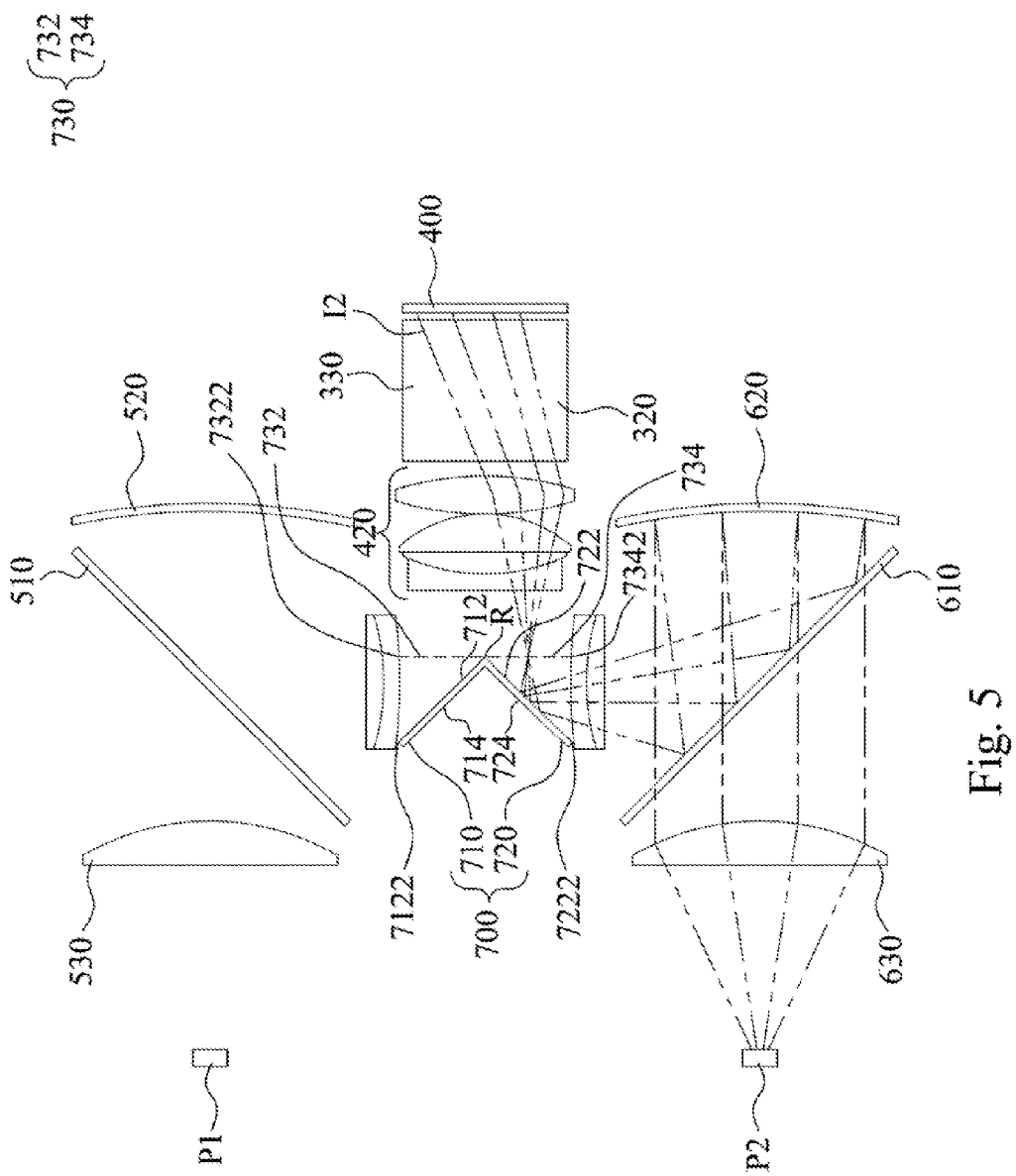
FIG. 5 is a schematic diagram showing an optical path of the head mounted display at a second time point in accordance with some embodiments of the present disclosure.

In some embodiments, the first light source module 100 and the second light source module 200 emit lights in a time sequence. In other words, the first light source module 100 and the second light source module 200 alternately emit lights according to the time sequence. Reference is made to FIG. 4, which is a schematic diagram showing an optical path of the head mounted display 10 at a first time point in accordance with some embodiments of the present disclosure. For example, as shown in FIG. 1 and FIG. 4, at a first time point, the first light source module 100 emits the first light L1, the first light L1 is redirected to the image output module 400 by the light reversely turning module 300 for generating the first image light I1, and the first image light I1 is guided into the first target position P1 (such as a left eye of an observer) by the beam splitting mirror 700 and the first eyepiece module 500. Reference is made to FIG. 5, which is a schematic diagram showing an optical path of the head mounted display 10 at a second time point in accordance with some embodiments of the present disclosure. For example, as shown in FIG. 1 and FIG. 5, at a second time point, the second light source module 200 emits the second light L2, the second light L2 is redirected to the image output module 400 by the light reversely turning module 300 for generating the second image light I2, and the second image light I2 is guided into the second target position P2 (such as a right eye of the observer) by the beam splitting mirror 700 and the second eyepiece module 600. As a result, by fast switching the first light source module 100 and the second light source module 200 in the time sequence, the corresponding first image light I1 and the second image light I2 may be respectively imaged to the first target position P1 and the second target position P2 in the time sequence, so as to achieve a stereoscopic display of the head mounted display 10. In other words, the head mounted display 10 of the present disclosure uses a time-multiplex way to switch the first light source module 100 and the second light source module 200 in the time sequence, so the head mounted display 10 can provide a stereoscopic image.

In some embodiments, the image output module 400 provides a plurality of reflected patterns in the time sequence, and the first light source module 100 and the second light source module 200 switched substantially synchronizes with the reflected patterns switched. More particularly, in some embodiments, the reflected patterns can be classified as a first group of reflected patterns and a second group of reflected patterns, and the first group of reflected patterns and the second group of reflected patterns are switched in the time sequence, that is, the image output module 400 alternately provides the first group of reflected patterns and the second group of reflected patterns according to the time sequence. For example, at the first time point, the first light source emits the first light L1 to the image output module 400, and the image output module 400 substantially provides the first group of reflected patterns in synchronization, so the image output module 400 receives the first light L1 and generates the first image light I1 with the image information of the first group of reflected patterns. Then, at the second time point, the second light source emits the second light L2 to the image output module 400, and the image output module 400 substantially provides the second group of reflected patterns in synchronization, so the image output module 400 receives the second light L2 and generates the second image light I2 with the image information of the second group of reflected patterns. In other words, at a first time t1, the first light source module 100 may be controlled to emit light, and the second light source module 200 may be controlled to not emit light, and the image output module 400 may be controlled to provide the first group of reflected patterns. Then, at a second time t2, the first light source module 100 may be controlled to not emit light, and the second light source module 200 may be controlled to emit light, and the image output module 400 may be controlled to provide the second group of reflected patterns. Accordingly, the first light L1 generated by the first light source module 100 substantially synchronizes with the first group of reflected patterns generated by the image output module 400, so as to generate the first image light I1 with the corresponding correct image information, which may benefit to image the first image light I1 to the first target position P1. Similarly, the second light L2 generated by the second light source module 200 substantially synchronizes with the second group of reflected patterns generated by the image output module 400, so as to generate the second image light I2 with the corresponding correct image information, which may benefit to image the second image light I2 to the second target position P1.

In accordance with some embodiments of the present disclosure, since the first light source module 100 and the second light source module 200 switch in a time sequence and the configuration of the beam splitting mirror 700, the head mounted display 10 may respectively provide the first image light I1 and the second image light I2 to a left eye and a right eye of an observer in the time sequence, so as to generate a stereoscopic image. Furthermore, the light reversely turning module 300 may make the propagating direction of the first light L1 in reverse to the propagating direction of the first image light I1, so the first light source module 100 and the image output module 400 may be located on different level heights. Similarly, the light reversely turning module 300 may make the propagating direction of the second light L2 in reverse to the propagating direction of the second image light I2, so the second light source module 200 and the image output module 400 may be located on different level heights. Therefore, the horizontal area of the head mounted display 10 may be reduced, benefiting to minimize the size of the head mounted display 10.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head mounted display, comprising:
a first light source module configured to emit a first light;
a second light source module configured to emit a second light;
an image output module configured to receive the first light and the second light, and to respectively generate a first image light and a second image light with corresponding image information;
a light reversely turning module optically coupled between the first light source module and the image output module, and optically coupled between the second light source module and the image output module, making a propagating direction of the first light in reverse to a propagating direction of the first image light, and making a propagating direction of the second light reverse to a propagating direction of the second image light;

a first eyepiece module configured to make the first image light image to a first target position;

a second eyepiece module configured to make the second image light image to a second target position; and a beam splitting mirror optically coupled between the image output module and the first eyepiece module, and optically coupled between the image output module and the second eyepiece module, and configured to respectively guide the first image light into the first eyepiece module and guide the second image light into the second eyepiece module.

2. The head mounted display of claim 1, wherein the light reversely turning module has a first light-redirecting unit and a second light-redirecting unit, the first light-redirecting unit is configured to reflect and redirect the first light from the first light source module and the second light from the second light source module to the second light-redirecting unit, and the second light-redirecting unit is configured to reflect and redirect the first light and the second light from the first light-redirecting unit to the image output module.

3. The head mounted display of claim 2, wherein the first light-redirecting unit has a reflective surface, and a distance between the reflective surface and the first light source module is increasing along a direction towards the second light-redirecting unit, and a distance between the reflective surface and the second light source module is increasing along the direction towards the second light-redirecting unit.

4. The head mounted display of claim 2, wherein the second light-redirecting unit has a redirecting surface, the redirecting surface is configured to reflect and redirect the first light and the second light from the first light-redirecting unit to the image output module, and then the first image light and the second image light generated by the image output module propagate into the redirecting surface, and an incident angle of the first image light and an incident angle of the second image light at the redirecting surface is less than a critical angle of the first image light and a critical angle of the second image light at the redirecting surface.

5. The head mounted display of claim 4, further comprises a penetrate assist unit abutted against the redirecting surface of the second light-redirecting unit, the penetrate assist unit and the second light-redirecting unit have different refractive indexes to make the first light and the second light propagating at the redirecting surface be reflected totally, and make at least one part of the first image light and the second image light penetrate the redirecting surface.

6. The head mounted display of claim 2, wherein the image output module is a digital micro-mirror device configured to reflect and make the first light from the second light-redirecting unit become the first image light, and to reflect and make the second light from the second light-redirecting unit become the second image light.

7. The head mounted display of claim 2, wherein a level height where the first light-redirecting unit is located is different from a level height where the second light-redirecting unit is located.

8. The head mounted display of claim 1, wherein the first light emitted by the first light source module and the second light emitted by the second light source module propagates along a first direction, and the first image light and the second image light emitted by the image output module propagates along a second direction, and the first direction is different from the second direction.

9. The head mounted display of claim 1, wherein a level height where the first light source module is located is different from a level height where the image output module is located.

10. The head mounted display of claim 9, wherein a level height where the second light source module is located is substantially equal to the level height where the first light source module is located.

11. The head mounted display of claim 1, wherein at least one of the first eyepiece module and the second eyepiece module has a partially light reflective unit and an image-reflected mirror, and the partially light reflective unit is configured to redirect the first image light or the second image light from the beam splitting mirror to the image-reflected mirror, and the image-reflected mirror is configured to make the first image light or the second image light from the partially light reflective unit to image to the first target position and the second target position.

12. The head mounted display of claim 1, wherein the first light source module and the second light source module emit lights in a time sequence.

13. The head mounted display of claim 12, wherein the image output module provides a plurality of reflected patterns in the time sequence.

14. The head mounted display of claim 13, wherein the first light source module and the second light source module switched substantially synchronizes with the reflected patterns switched.

15. The head mounted display of claim 1, further comprising:

a lens group optically coupled between the image output module and the beam splitting mirror, and the lens group is configured to adjust qualities of images of the first image light and the second image light.

* * * * *